United States Patent [19]

Goria

[11] Patent Number: 4,968,087
[45] Date of Patent: Nov. 6, 1990

[54] METHOD FOR THE ASSEMBLY OF VARIOUS VERSIONS OF MOTOR-CAR BODY STRUCTURES AND BODY STRUCTURES PRODUCED BY THIS METHOD

[75] Inventor: Aldo Goria, Piobesi Torinese, Italy

[73] Assignee: Fiat Auto S.p.A., Turin, Italy

[21] Appl. No.: 341,180

[22] Filed: Apr. 21, 1989

[30] Foreign Application Priority Data

Apr. 22, 1988 [IT] Italy ................. 67378 A/88

[51] Int. Cl.⁵ ............................................ B62D 25/08
[52] U.S. Cl. .................................. 296/197; 296/29;
296/193; 296/195; 296/196; 296/203
[58] Field of Search ............... 296/197, 196, 195, 193, 296/203, 29

[56] References Cited

U.S. PATENT DOCUMENTS

| | | | |
|---|---|---|---|
| 2,405,643 | 8/1946 | Crot | 296/29 X |
| 2,612,964 | 10/1952 | Hobbs | 296/203 X |
| 2,797,952 | 7/1957 | Barényl et al. | 296/193 X |
| 4,422,685 | 12/1983 | Bonfilio et al. | 296/197 |
| 4,676,545 | 6/1987 | Bonfilio et al. | 244/120 X |
| 4,842,326 | 6/1989 | DiVito | 296/197 X |
| 4,887,859 | 12/1989 | Aper | 296/196 X |
| 4,900,083 | 2/1990 | Kumasaka et al. | 296/196 X |

FOREIGN PATENT DOCUMENTS

| | | | |
|---|---|---|---|
| 180554 | 5/1986 | European Pat. Off. | |
| 450421 | 10/1927 | Fed. Rep. of Germany | 296/203 |
| 827904 | 1/1952 | Fed. Rep. of Germany | 296/196 |
| 767574 | 12/1952 | Fed. Rep. of Germany | 296/203 |
| 1026247 | 4/1953 | France | 296/203 |

Primary Examiner—Margaret A. Focarino
Assistant Examiner—Andrew C. Pike
Attorney, Agent, or Firm—Sughrue, Mion, Zinn, Macpeak & Seas

[57] ABSTRACT

Various versions of motor-car bodies are assembled by the provision of a standard central module (4) including a floor (5) and a framework (6, 7, 8), which form a common preassembled partial structure for all the different versions of the body structure, and a series of different rear modules (11, 12, 13) which can be assembled with the central module (4) to produce the various versions of the body structure. The standard central module and the different rear modules are formed with mutual joining surfaces in a single plane (FIG. 7).

8 Claims, 7 Drawing Sheets

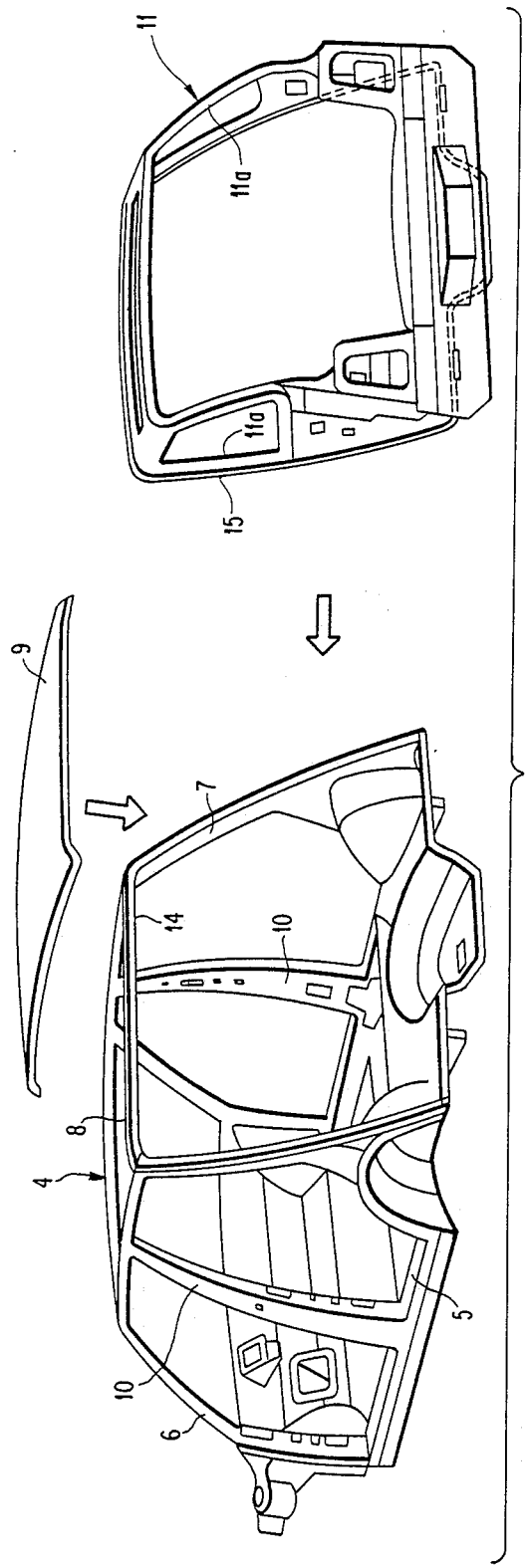
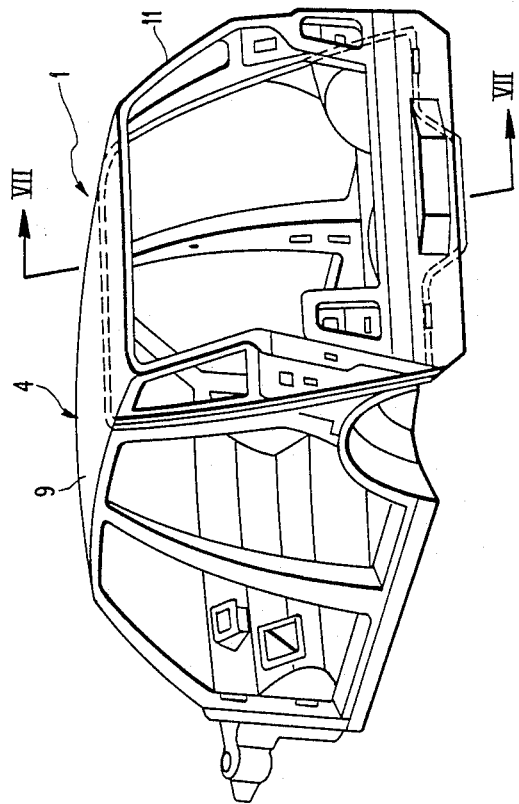
FIG. 1
FIG. 2

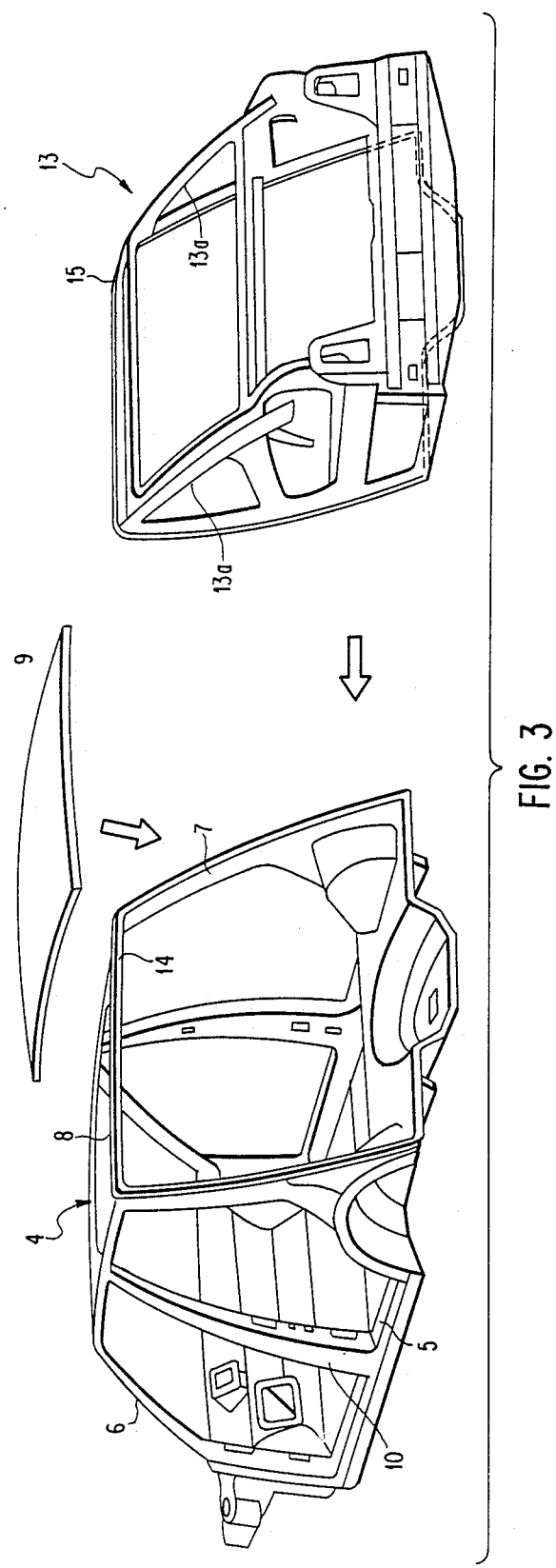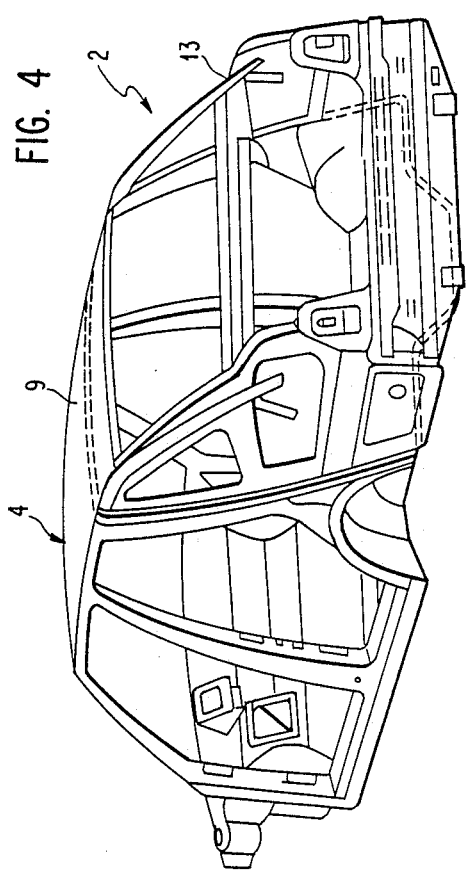

METHOD FOR THE ASSEMBLY OF VARIOUS VERSIONS OF MOTOR-CAR BODY STRUCTURES AND BODY STRUCTURES PRODUCED BY THIS METHOD

BACKGROUND OF THE INVENTION

The present invention relates to a method for the assembly of various versions of motor-car body structures.

In the production of motor-car bodies, the provision of a standard central module including a floor and a framework, which form a common preassembled partial structure for all the different versions of the body structure, and a series of different rear modules which can be assembled with the central module to produce the various versions of the body structure, is known. It is thus possible to produce body structures for two-compartment, three-compartment, two-door and four-door versions of the same type of motor car in a simplified manner.

According to the prior art, described for example in EP-A-180554, the connection between the central module and the rear modules involves mutually copenetrating and interlocking parts which require extremely accurate manufacture and joining with consequent production difficulties and problems.

Moreover, the rear modules usually have two lateral walls in which apertures are provided which form respective window openings for housing the relative panes of glass. According to known techniques, these apertures are open at the front and are completed during assembly by being closed by the central module. This conformation also obviously requires perfect accuracy of coupling and may moreover involve difficulties in the sealing of the side panes of glass which are subsequently fitted in the openings.

SUMMARY OF THE INVENTION

The object of the present invention is to avoid these problems, and to provide a method for the assembly of motor-car body structures of the type defined, which enables the joining of the central module to the various rear modules to be made simpler and easier, and avoids the risks of unevenness and connection anomalies.

In order to achieve this object, the method according to the invention is characterised in that the standard central module and the different rear modules are formed with mutual joining surfaces in a single plane.

By virtue of this concept, elements for the copenetration or interlocking of the modules are eliminated, so that the necessary accuracy of coupling is ensured without particular difficulty.

Moreover, the method according to the invention conveniently provides for the use of rear modules provided with complete frames defining side window openings.

This characteristic further simplifies the joining of the modules and avoids problems in the sealing of the panes of glass subsequently fitted to the openings.

The joining plane between the modules is usually arranged obliquely.

The surfaces for mutual joining of the modules are conveniently formed by respective annular flanges which are accessible from the outside of the modules for their mutual connection.

A further subject of the invention is a body structure for motor cars produced by the method defined above.

BRIEF DESCRIPTION OF THE DRAWINGS

The invention will now be described in detail with reference to the appended drawings, provided purely by way of non-limiting example, in which:

FIG. 1 is a perspective view of a first version of a motor-car body structure, shown before its assembly by the method according to the invention, FIG. 2 shows the body structure of FIG. 1 after its assembly, FIGS. 3 and 4 are two views, similar to FIGS. 1 and 2, of a body structure for a second version of the same motor car.

DETAILED DESCRIPTION OF THE INVENTION

Figure 5:
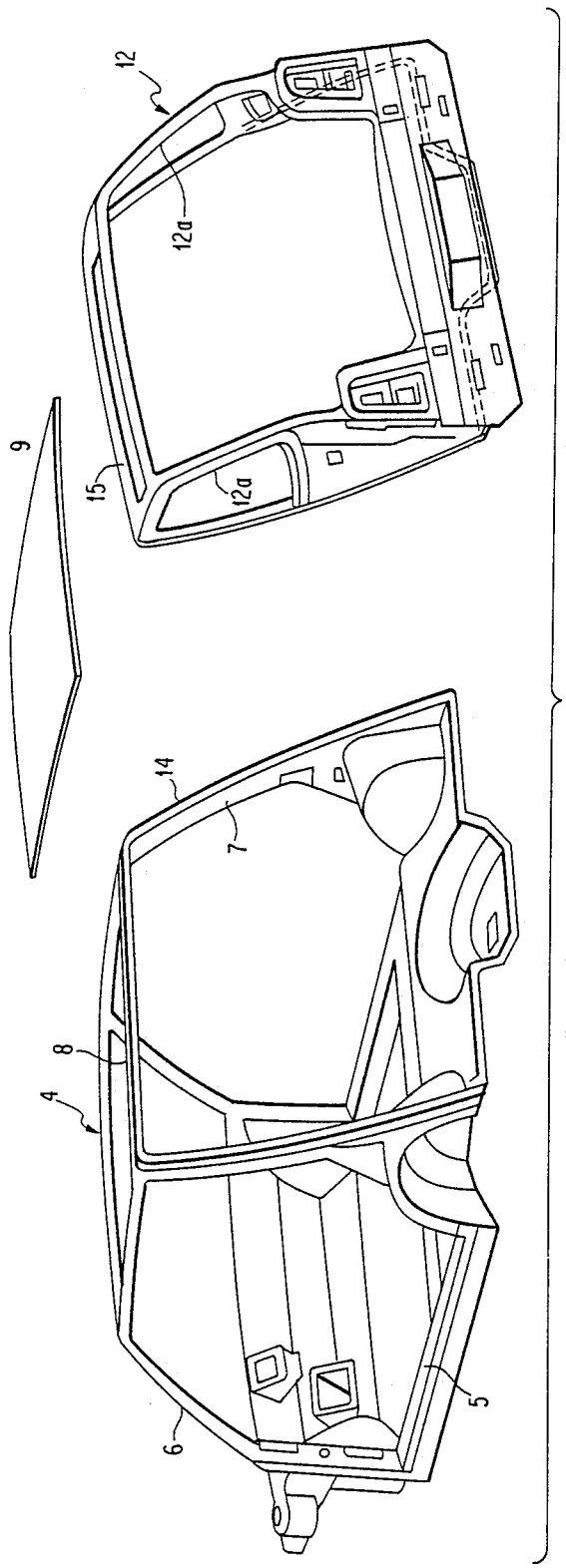
FIGS. 5 and 6 are two views, similar to FIGS. 1 and 2, of a body structure for a third version of the motor car.
Figure 6:
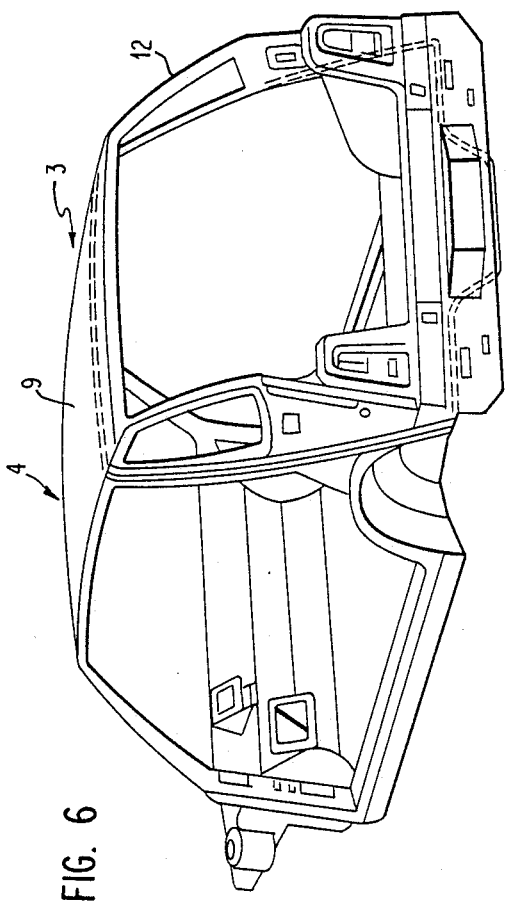

In the embodiment illustrated in the drawings, the method according to the invention is used to assemble various body structures which correspond to various versions of the same model of motor car: in particular, FIGS. 1 and 2 show a body structure 1 for the two-compartment, four-door version of the car, FIGS. 3 and 4 show a body structure 2 for the three-compartment, four-door version of the same car, and FIGS. 5 and 6 show the body structure 3 for the two-compartment, two-door version of the car.

According to the method which forms the subject of the present invention, the three body structures 1, 2, and 3 are assembled from a standard central module 4 constituted by a pre-assembled partial structure which is common to the three body versions. The central module 4 is composed essentially of a floor 5, two side frames 6, 7 and an upper frame 8 to which a roof element 9 is fixed. In the case of the body structures shown in FIGS. 1, 2 and 3, 4, which relate, as stated, to the four-door versions of the car, the central module 4 also includes two intermediate side pillars 10. These pillars 10 are omitted, however, in the body structure for the two-door version shown in FIGS. 5 and 6.

The body structures 1, 2, and 3 are completed by means of respective rear modules 11, 13, and 12, which are different for the three versions of the car. These rear modules 11, 12, and 13, however, have a common characteristic, which consists of the fact that all three are provided at the sides with respective complete frames 11a, 12a, and 13a defining side window openings.

According to the invention, the standard central module 4 and the different rear modules 11, 13, and 12 of the body structures 1, 2, and 3, respectively, are formed with mutual joining surfaces arranged in a single continuous plane. The line of this plane is indicated by A in FIG. 7, which relates to the body structure 1 of FIGS. 1 and 2, and also has an identical arrangement in the body versions 2 and 3 shown in FIGS. 3, 4 and 5, 6, respectively.

Figure 7:
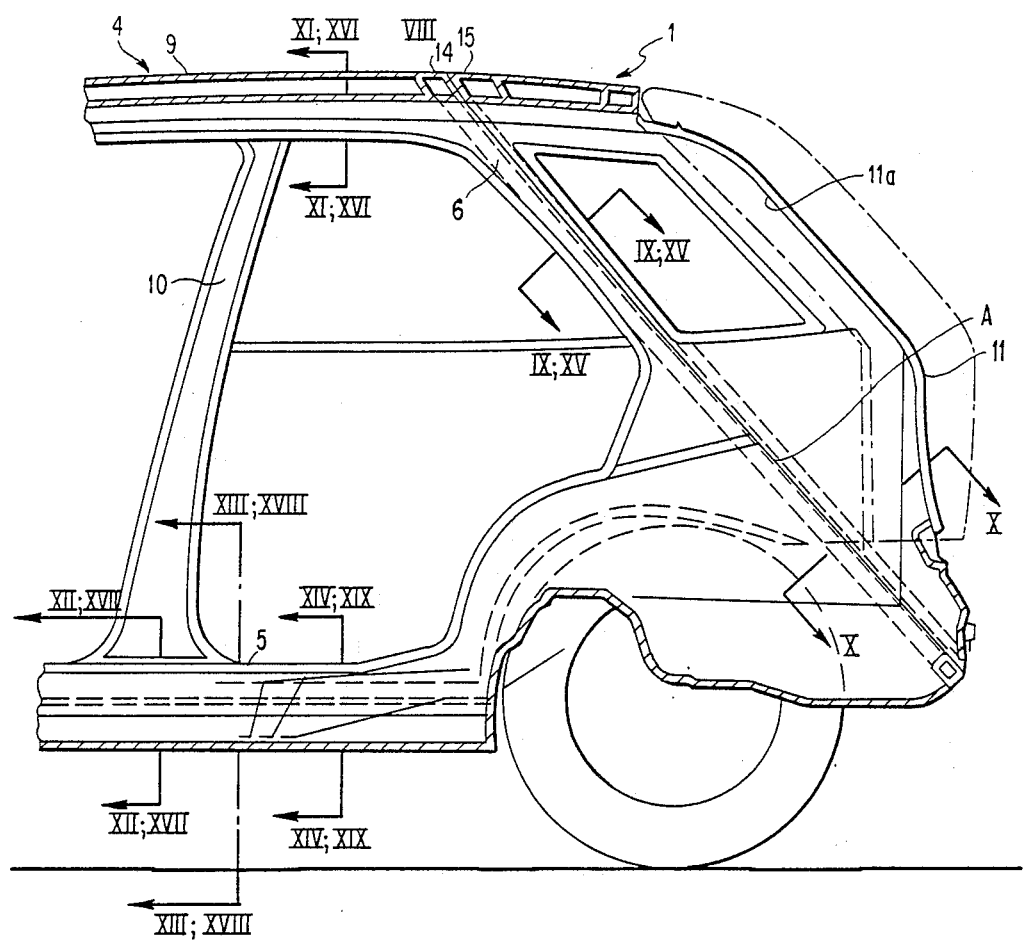
FIG. 7 is a longitudinal sectional view taken on the line VII—VII of FIG. 2 on an enlarged scale.
Figure 8:
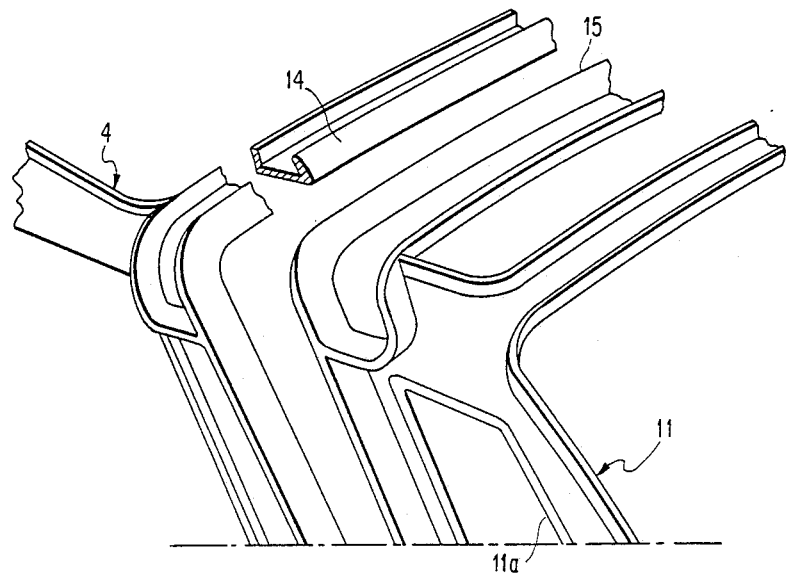
FIG. 8 is an exploded perspective view taken on the arrow VIII of FIG. 7 on an enlarged scale.

As is clear from FIG. 7, the joining plane A is arranged obliquely: it si defined by respective annular flanges 14, 15, which are formed in correspondence with facing ends of the central module 4 and the rear module 11 (or 12 or 13), and are accessible from the outside after they have been placed side by side and joined during assembly by spot welding, laser welding or even by means of screws and/or gluing with structural adhesive. FIG. 8 shows the arrangement of the joining flanges 14 and 15 before coupling, whilst FIGS. 9 and 10 show these flanges after their mutual fixing in two different regions.

Figure 9:
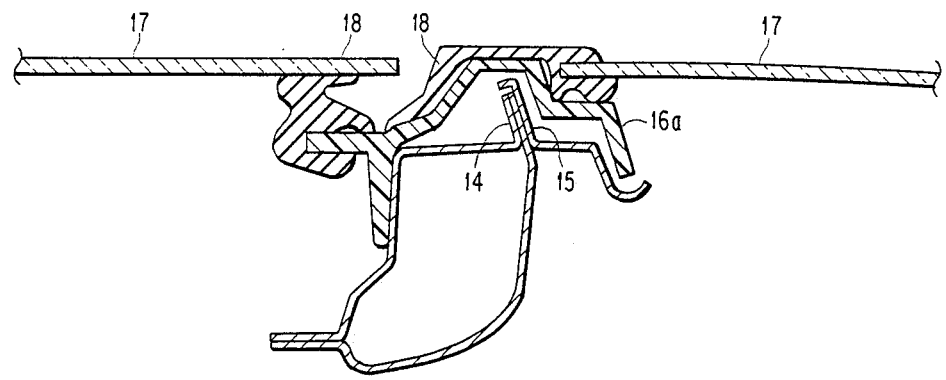
FIG. 9 is a section taken on the line IX—IX of FIG. 7 on an enlarged scale.
Figure 10:
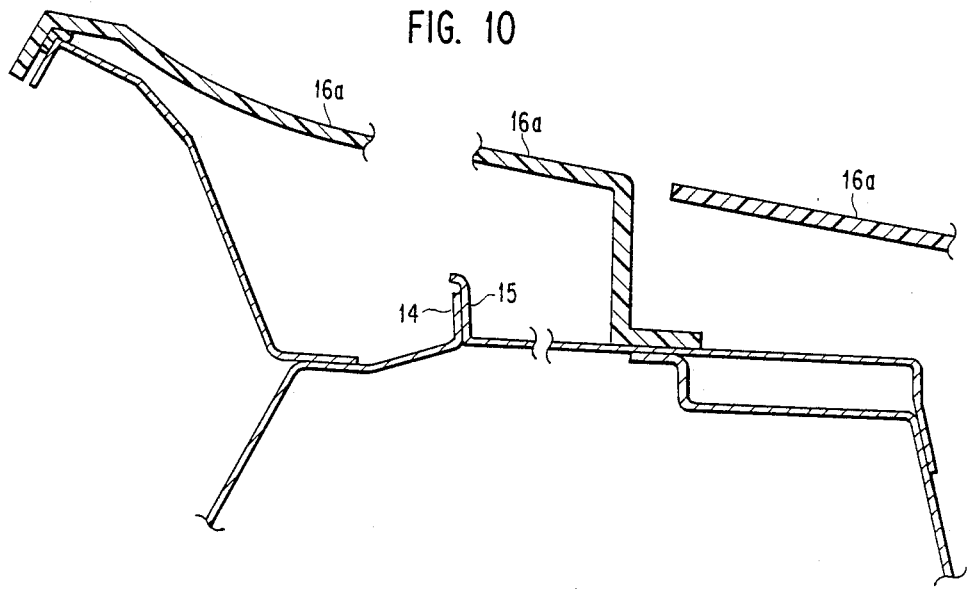
FIG. 10 is a section taken on the line X—X of FIG. 7 on an enlarged scale.
Figure 11:
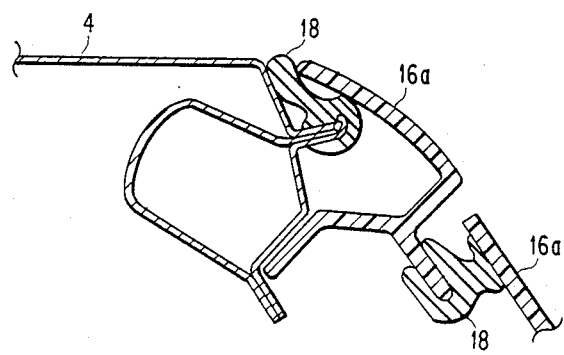
FIG. 11 is a section taken on the line XI—XI of FIG. 7 on an enlarged scale.
Figure 12:
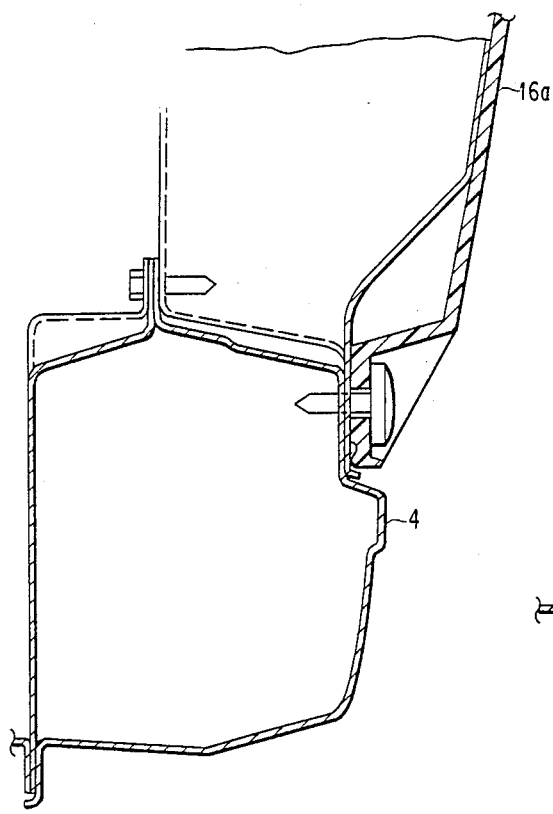
FIG. 12 is a section taken on the line XII—XII of FIG. 7 on an enlarged scale.
Figure 13:
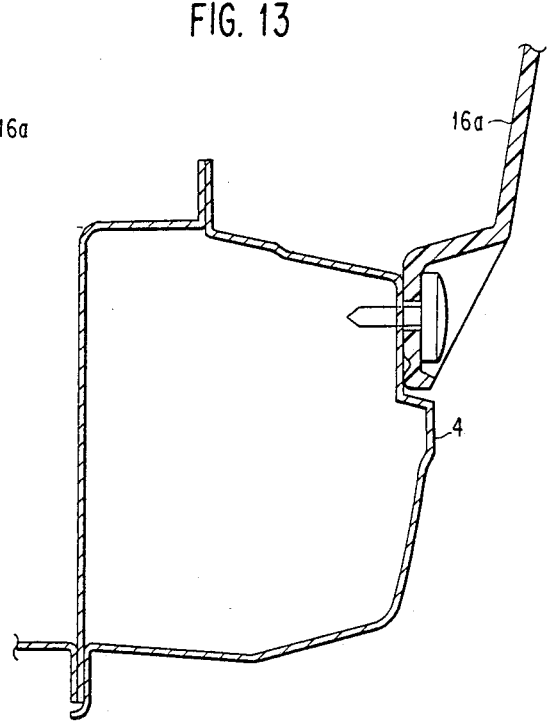
FIG. 13 is a section taken on the line XIII—XIII of FIG. 7 on an enlarged scale.
Figure 14:
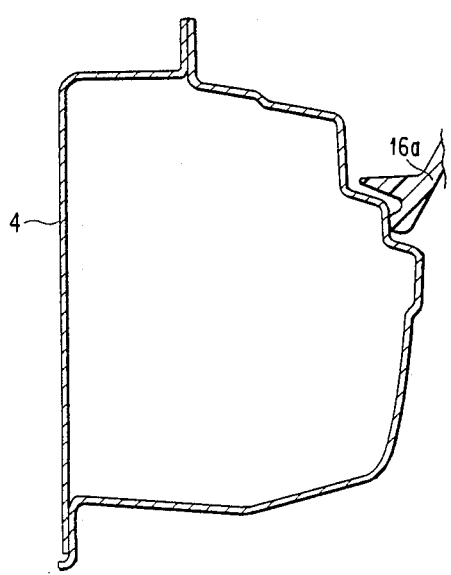
FIG. 14 is a section taken on the line XIV—XIV of FIG. 7 on an enlarged scale.
Figure 15:
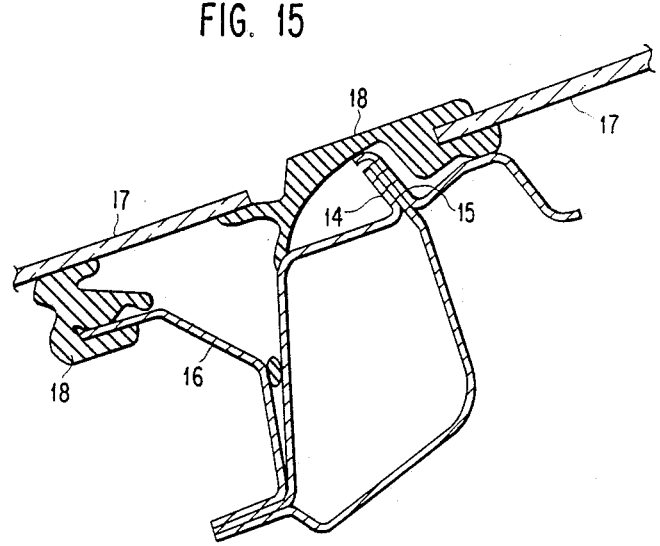
FIG. 15 is a section taken on the line XV—XV of FIG. 7 on an enlarged scale.
Figure 16:
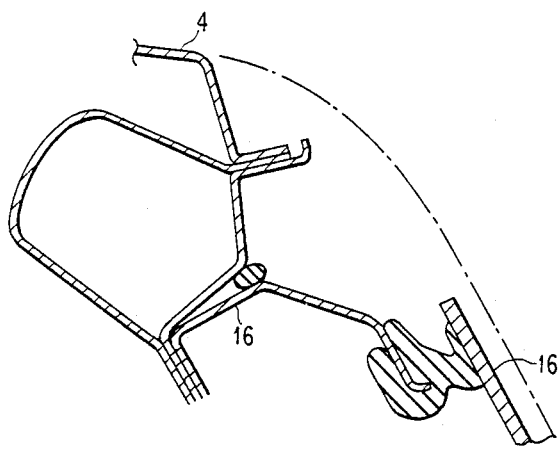
FIG. 16 is a section taken on the line XVI—XVI of FIG. 7 on an enlarged scale.
Figure 17:
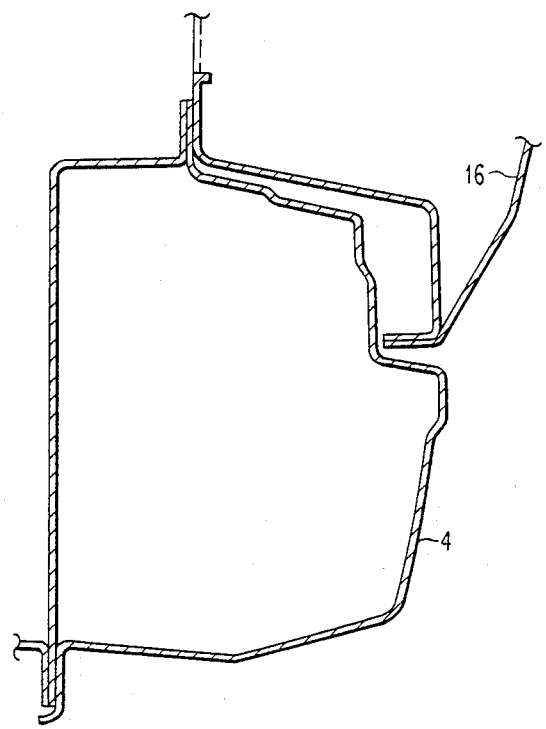
FIG. 17 is a section taken on the line XVII—XVII of FIG. 7 on an enlarged scale.
Figures 18, 19:
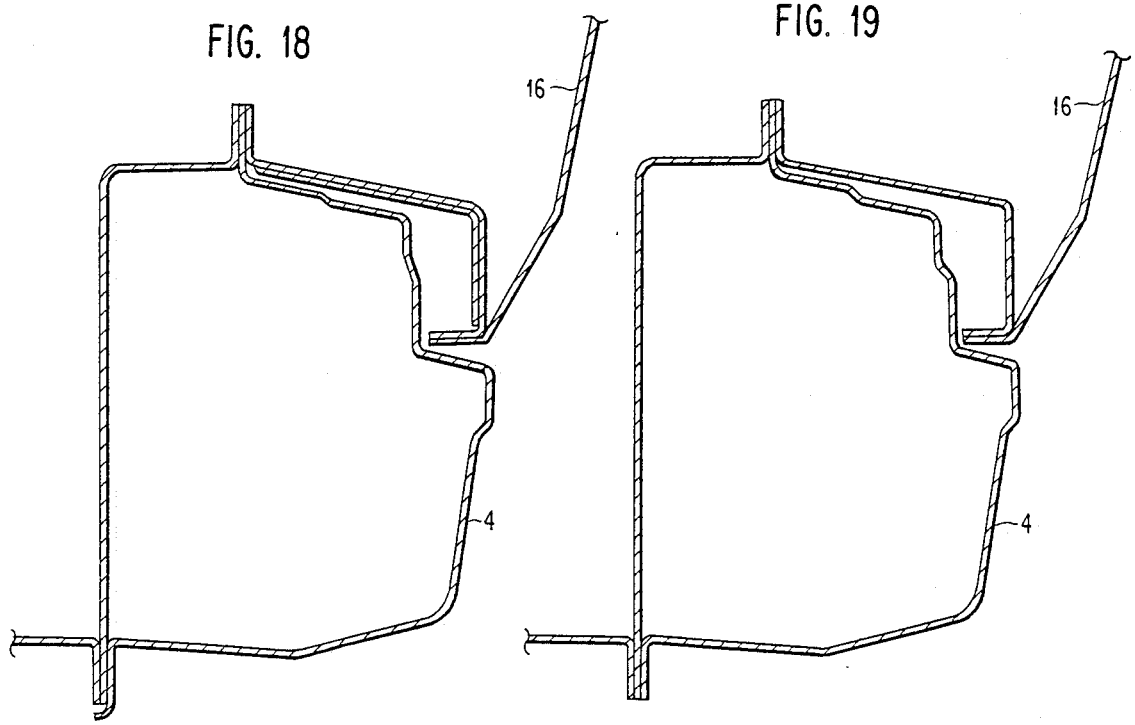
FIG. 18 is a section taken on the line XVIII—XVIII of FIG. 7 on an enlarged scale.
FIG. 19 is a section taken on the line XIX—XIX of FIG. 7 on an enlarged scale.

Once the assembly of the body structure 1, 2, or 3 is completed, the bodywork of the car is completed by the addition of outer finishing panels of sheet metal 16 or plastics material (indicated by 16a, for example, in FIG. 10 as well as by window panes and respective weatherstrips indicated by 17 and 18, respectively, in FIGS. 9 and 15. FIGS. 9 and 15 are views taken along the same section line in FIG. 7 and show the use of plastic support strips 16a in FIG. 9 and the use of sheet metal support strips 16 in FIG. 15 for the weatherstrips 18.

FIGS. 11 to 14 show the way in which the central module 4 and the finishing panels 16 of plastics material 16a are connected in different regions of the body structure 1 of FIG. 7.

FIGS. 16 to 19 are views taken on the same section lines of FIG. 7 as FIGS. 11 to 14 and show the use of finishing panels of sheet metal 16.

It is clear from the above description that the method according to the invention enables various versions of motor-car body structures to be produced extremely simply and easily, particularly by virtue of the fact that the joining of the modules in a single coupling plane, and therefore without parts for the copenetration and interlocking of the modules, enables the necessary accuracy of joining to be achieved easily.

I claim:

1. A method for assembly of various versions of a motorcar body, said method comprising the steps of:
   fabricating a central module having a floor and an upper frame in one of a plurality of possible central module configurations with a continuous annular joining surface in a single plane on a rear end thereof;
   fabricating a rear module in one of a plurality of possible rear module configurations with another continuous annular joining surface in another single plane on a forward end thereof adapted to completely abut against said joining surface on the rear end of said central module;
   abutting both said joining surfaces directly against each other; and
   connecting both said joining surfaces together to form said motorcar body.

2. A method as set forth in claim 1, further comprising fabricating both said modules with each plane of each said joining surface disposed obliquely relative to a vertically disposed plane extending transversely of said body.

3. A method as set forth in claim 1, further comprising fabricating said rear module with side window openings having complete frames.

4. A method as set forth in claim 1, further comprising fabricating each said joining surface on each said module as an annular flange extending outwardly of each respective module for access outside of each said module to facilitate connecting both said joining surfaces together.

5. A body structure for various versions of a motorcar, said body structure comprising:
   a central module having a floor and an upper frame interconnected in one of a plurality of possible central module configurations with a continuous annular joining surface in a single plane on a rear end thereof;
   a rear module in one of a plurality of possible rear module configurations with another continuous annular joining surface in another single plane on a forward end thereof abutting against said joining surface on the rear end of said central module; and
   means for directly connecting both said joining surfaces together.

6. A body structure as set forth in claim 5, wherein each said plane of each said joining surface is disposed obliquely relative to a vertically disposed plane extending transversely of said body structure.

7. A body structure as set forth in claim 5, wherein said rear module includes complete frames defining side window openings.

8. A body structure as set forth in claim 5, wherein each said joining surface is comprised of an annular flange extending outwardly of each respective module for access externally of each said module for connecting both said surfaces together.

* * * * *